United States Patent [19] [11] 3,887,549
Christensen [45] June 3, 1975

[54] PROCESS FOR PREPARING 7-ACYLAMIDO-7-METHOXY-3-CEPHEM-4-CARBOXYLIC ACID, ESTERS AND SALTS

[75] Inventor: Burton G. Christensen, Scotch Plains, N.J.

[73] Assignee: Merck & Co., Inc., Rahway, N.J.

[22] Filed: Apr. 12, 1972

[21] Appl. No.: 243,438

Related U.S. Application Data

[63] Continuation-in-part of Ser. No. 200,587, Nov. 19, 1971, abandoned.

[52] U.S. Cl. .............................. 260/243 C; 424/246
[51] Int. Cl. ............................................. C07d 99/24
[58] Field of Search ................................ 260/243 C

[56] References Cited
UNITED STATES PATENTS
3,597,421  8/1971  Webber.......................... 260/243 C
3,705,897  12/1972  Murphy........................... 260/243 C
3,718,644  2/1973  Weston et al................... 260/243 C
3,719,563  3/1973  Hamill et al. .................... 260/243 C Primary Examiner—Nicholas J. Rizzo
Attorney, Agent, or Firm—Walter Patton; Julian S. Levitt; J. Jerome Behan

[57] ABSTRACT

Process for preparing 7-acylamido-7-methoxy-3-cephem-4-carboxylic acid and its corresponding esters and salts which comprises treating the corresponding 7-acylamido-7-methoxy-2-cephem-4-carboxylic acid compound with an isomerizing agent. The products are useful as antibiotics.

13 Claims, No Drawings

PROCESS FOR PREPARING 7-ACYLAMIDO-7-METHOXY-3-CEPHEM-4-CARBOXYLIC ACID, ESTERS AND SALTS

This is a continuation-in-part of applicant's U.S. application Ser. No. 200,587, now abandoned filed Nov. 19, 1971.

This invention relates to the preparation of compounds of the formula:

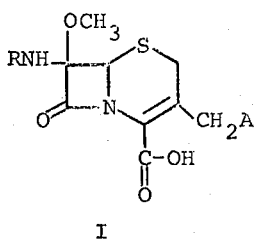

I and its non-toxic, pharmaceutically acceptable salts and esters wherein A is hydrogen, hydroxy, azido, halo such as fluoro, chloro or bromo, carbamoyloxy, N-lower alkyl carbamoyloxy such as N-methyl carbamoyloxy and the like, N,N-di-lower alkyl carbamoyloxy such as N,N-dimethyl carbamoyloxy and the like, a tertiary amine such as pyridine and the like, lower alkoxy such as methoxy, ethoxy, tertiary butoxy and the like, acyloxy, for example, lower alkanoyloxy such as acetoxy, propionyloxy and the like or aroyloxy such as benzoyloxy and the like or a 5-membered heterocyclic thio such as 5-methyl-1,3,4-thiadiazolyl-2-thio and the like and R is an acyl radical, for example, an aliphatic, aromatic, heterocyclic, araliphatic or heterocyclic aliphatic carboxylic acid radical of the formula:

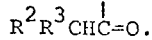

Cephalosporins having a 7-methoxy substituent are effective against gram-negative bacteria including *Escherichia coli, Proteus vulgaris, Proteus mirabilis, Proteus morganii, Salmonella schottmuelleri, Klebsiella pneumoniae AD, Klebsiella pneumoniae B*, and *Paracolobactrum arizoniae* and gram positive bacteria including *Staphylococcus aureus, Streptococcus pyogenes* and *Diplococcus pneumoniae*.

The cephalosporins are useful in removing susceptible microorganisms from pharmaceutical, medical and dental equipment and as bactericides in industrial applications, for example, in water based paints and in the white water of paper mills to inhibit the growth of harmful bacteria.

The process comprises treating the corresponding 7-acylamido-7-methoxy-2-cephem-4-carboxylic acid (II, infra) with an isomerizing agent, preferably a base, for example, an organic base such as an aliphatic or heterocyclic amine such as pyridine, triethylamine and the like or an inorganic base derived from an alkali metal or an alkaline earth metal, for example, an alkali metal or alkaline earth metal carbonate or hydroxide such as sodium carbonate, potassium carbonate, sodium hydroxide, calcium hydroxide and the like. Alumina and silica gel also effect isomerization; however, the organic bases are the preferred isomerizing agents. In general, any inert solvent in which the reactants are soluble may be employed, for example, when an alkali metal or alkaline earth metal base is employed, the solvent is water with a miscible organic solvent such as dioxane, tetrahydrofuran and the like. When an organic base is employed, it has been found convenient to use an excess of the organic base as the solvent. The temperature at which the reaction is conducted is not a particularly critical aspect of this invention and, in general, the reaction is conducted at room temperature for a period of time of from about 5 hours to 3 days or until isomerization no longer occurs. The following equation illustrates this process:

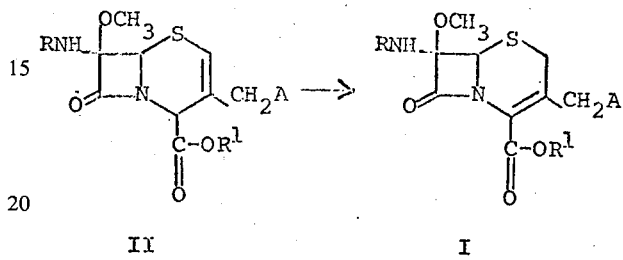

wherein A and R are as defined above and $R^1$ is hydrogen or an ester group.

Those compounds wherein the acyl radical is of the formula:

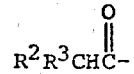

wherein $R^2$ and $R^3$ are as defined below, and A is hydrogen, lower alkanoyloxy, carbamoyloxy or pyridine represent a preferred group of radicals because of the generally enhanced antibiotic activity of the $\Delta^3$-compounds containing these radicals. $R^2$ represents hydrogen, halo, amino, guanidino, phosphono, hydroxy, tetrazolyl, carboxy, sulfo or sulfamino. $R^3$ represents phenyl, substituted phenyl, a 5- or 6-membered monocyclicheterocycle containing one or more oxygen, sulfur or nitrogen hetero atoms in the ring such as furyl, thienyl, thiazolyl, isothiazolyl, oxadiazolyl, thiadiazolyl and the like, substituted heterocycles, phenylthio, heterocyclic or substituted heterocyclic thio groups or cyano. The substituents can be halo, carboxymethyl, guanidino, guanidinomethyl, carboxamidomethyl, aminomethyl, nitro, methoxy or methyl. Especially preferred are those acyl radicals where $R^2$ is hydrogen, amino or carboxy and $R^3$ is phenyl or a 5- or 6-membered heterocyclic ring containing from 1 to 2 sulfur, oxygen or nitrogen atoms. Examples of these preferred radicals are phenylacetyl, 3-bromophenylacetyl, p-aminomethylphenylacetyl, 4-carboxymethylphenylacetyl, 4-carboxamidomethylphenylacetyl, 2-furylacetyl, 5-nitrofurylacetyl, 3-furylacetyl, 5-chlorothienylacetyl, 5-methoxythienylacetyl, α-quanidino-2-thienylacetyl, 3-thienylacetyl, 4-methylthienylacetyl, 3-isothiazolylacetyl, 4-methoxyisothiazolylacetyl, 4-isothiazolylacetyl, 3-methylisothiazolylacetyl, 5-isothiazolylacetyl, 3-chloroisothiazolylacetyl, 3-methyl-1,2,5-oxadiazolylacetyl, 1,2,5-thiadiazolyl-4-acetyl, 3-methyl-1,2,5-thiadiazolyl-4-acetyl, 3-chloro-1,2,5-thiadiazolyl-4-acetyl, 3-methoxy-1,2,5-thiadiazolyl-4-acetyl, phenylthioacetyl, 4-pyridylthioacetyl, cyanoacetyl, tetrazolylacetyl, α-fluorophenylacetyl, D-phenylglycyl, 4-hydroxy-D-phenylglycyl, 2- thienylglycyl, 3-thienylglycyl, phenylmalonyl, 3-chlorophenylmalonyl, 2-thienylmalonyl, 3-thienylmalonyl, α-phosphonophenylacetyl, α-sulfaminophenylacetyl, α-hydroxyphenylacetyl, α-tetrazolylphenylacetyl and α-sulfophenylacetyl. An especially preferred substituent is 2-thienylacetyl.

In carrying out this reaction the 4-carboxy group and other carboxy, amino or hydroxy groups in the nucleus are preferably protected with an ester group ($R^1$ in the formulas), for example, an ester group selected from trichloroethyl, tert-butyl, benzoylmethyl, p-methoxybenzyl, benzyl, benzhydryl, trimethylsilyl, methoxymethyl and the like. These ester groups may be removed by methods well known to those skilled in the art, for example, the benzhydryl or phenylalkyl may be removed by hydrogenation in the presence of a catalyst such as palladium-on-carbon or by treatment with a strong organic or inorganic acid. The tert-butyl or methoxymethyl groups may also be removed by treatment with a strong organic or inorganic acid. Examples of these acids are hydrochloric acid, sulfuric acid, boron trifluoride etherate, formic acid, trifluoroacetic acid, trichloroacetic acid, nitrobenzoic acid and the like.

The process for preparing the 7-acylamido-7-methoxy-2-cephem-4-carboxylic acid ester (II) comprises treating a corresponding 7-amino-7-methoxy-2-cephem-4-carboxylic acid ester (III, infra) with an acylating agent, for example, an acyl halide or acyl anhydride such as an aliphatic, aromatic, heterocyclic, araliphatic or heterocyclic aliphatic carboxylic acid halide or anhydride. Other acylating agents may also be employed, for example, a mixed acid anhydride with other carboxylic acids and particularly lower alkyl esters of carboxylic acids; also, carboxylic acids in the presence of a carbodiimide such as 1,3-dicyclohexylcarbodiimide, an activated ester of a carboxylic acid such as the p-nitrophenyl ester or by enzymatic acylation. The reaction may be conducted at a temperature in the range of from about −20°C. to about 100°C. but is preferably conducted at a temperature in the range of from 0° to 25°C. Any solvent in which the reactants are soluble and substantially inert may be employed, for example, hydrocarbons such as benzene, toluene and the like or tertiary amines, for example, trialkylamines and heterocyclic amines such as trimethylamine, pyridine and the like. The reaction is conducted for a period of time of from about 5 minutes to a maximum of 3 hours but, in general, a reaction time of about 0.5 to about 1 hour is sufficient. The following equation illustrates this process employing the carboxylic acid halide; however, it is to be understood that by substituting the corresponding carboxylic acid anhydride or other functionally equivalent acylating agents similar products may be obtained:

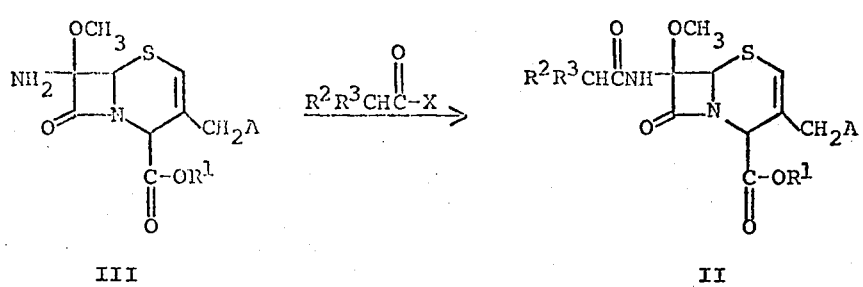

wherein A, $R^1$, $R^2$ and $R^3$ are as defined above and X is halo, for example, chloro, bromo and the like.

The 7-amino-7-methoxy-2-cephem-4-carboxylic acid ester (III) employed above can be prepared by processes which can be depicted as follows:

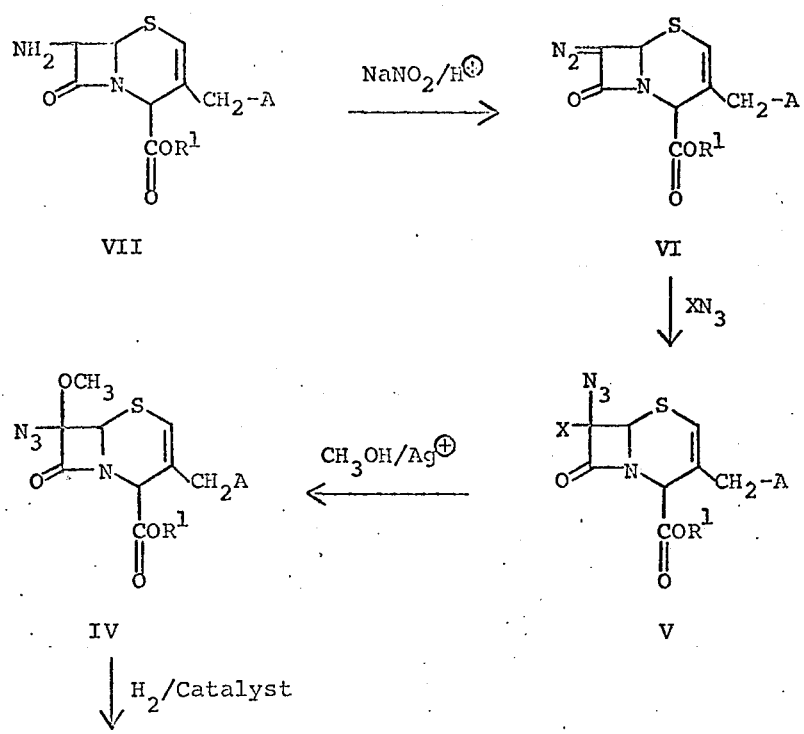

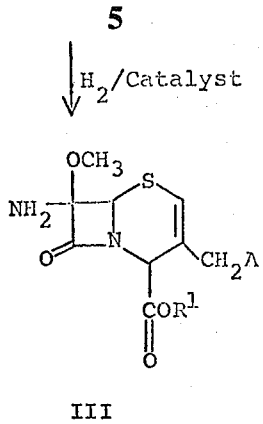

III wherein A and R[1] are as defined above and X is halo, for example, bromo, chloro, iodo and the like.

In the foregoing flowsheet the compound 7-amino-2-cephem-4-carboxylic acid ester (VII) is treated with sodium nitrite in the presence of an acid such as p-toluenesulfonic acid and the like. Organic solvents suitable for carrying out this reaction are those that do not contain an active hydrogen, for example, methylene chloride, ether, benzene, toluene, chloroform and the like. The reaction may be conducted at a temperature in the range of from about 0° to about 50°C. However, in general, the reaction is conveniently conducted at room temperature.

The 7-diazo-2-cephem-4-carboxylic acid ester (VI) obtained thereby is then treated with a halogen azide selected from bromine azide, chlorine azide or iodine azide; preferably, in the presence of a tertiary ammonium azide. The tertiary ammonium azide is employed to minimize the formation of any undesired 7-dihalo compound. This reaction is conducted at a temperature in the range of from about −20° to about 50°C. and is preferably conducted in solvents that do not contain an active hydrogen such as methylene chloride, chloroform, benzene, toluene, ether and the like or mixtures thereof.

The 7-halo-7-azido-2-cephem-4-carboxylic acid ester (V) is then treated with methanol in the presence of a silver salt such as silver tetrafluoroborate to afford the 7-methoxy-7-azido compound (IV) which is then reduced by catalytic hydrogenation employing a noble metal catalyst such as platinum, palladium and the like or oxides thereof ester (III).

The 7-amino-2-cephem-4-carboxylic acid esters (VII, supra) are prepared by treating the corresponding Δ[3] compound (VIII, infra) with an isomerizing agent, for example, a base including an organic base such as a heterocyclic amine or trialkylamine such as pyridine, triethylamine and the like. The following equation illustrates this process:

Nov. 19, 1971 in the names of Burton G. Christensen and Lovji D. Cama.

Included within the scope of this invention are the non-toxic, pharmaceutically acceptable salts of the instant products. In general, any base which will form a salt of the 7-acylamido-7-methoxy-3-cephem-4-carboxylic acid and whose pharmacological properties will not cause an adverse physiological effect when ingested by the body system is considered as being within the scope of this invention. Preferred salts are the sodium and potassium salt derivatives.

Also included in addition to the esters described above are other ester derivatives which are prepared by conventional methods. These include the lower alkyl esters such as methyl ester, ethyl ester and the like.

These non-toxic, pharmaceutically acceptable salts and esters of 7-acylamido-7-methoxy-3-cephem-4-carboxylic acid are the functional equivalent of the corresponding acid.

The following examples illustrate the novel process of this invention. However, the examples are illustrative only and it will be apparent to those skilled in the art that other reagents similar to those described in the following examples may be employed to afford similar results.

EXAMPLE 1

3-Carbamoyloxymethyl-7-(2-thienylacetamido)-7-methoxy 3-Cephem-4-Carboxylic Acid and Sodium Salt Step A: Benzhydryl 3-Carbamoyloxymethyl-7-amino-2-cephem-4-carboxylate Benzhydryl 3-carbamoyloxymethyl-7-amino-3-cephem-4-carboxylate (3 g.) is dissolved in 12 ml. of dry pyridine. The reaction mixture is allowed to stand at room temperature for 4 hours. The reaction mixture is evaporated to an oil which is benzhydryl 3-carbamoyloxymethyl-7-amino-2-cephem-4-carboxylate.

Step B: Benzhydryl 3-carbamoyloxymethyl-7-diazo-2-cephem-4-carboxylate

To 2 g. of sodium nitrite, 40 ml. of methylene chloride and 40 g. of ice, in a separatory funnel, is added 1.32 g. (0.003 mole) of benzhydryl 3-carbamoyloxymethyl-7-amino-2-cephem-4-carboxylate. The mixture is vigorously shaken and then 1.14 g. (0.006 mole) of p-toluenesulfonic acid is added in 3 equal amounts over 15 minutes while the shaking is continued. After shaking another 5 minutes the organic phase is separated, washed once with water, dried over sodium sulfate at 0°C., filtered and evaporated under vacuum below room temperature to afford benzhydryl 3-carbamoyloxymethyl-7-diazo-2-cephem-4-carboxylate.

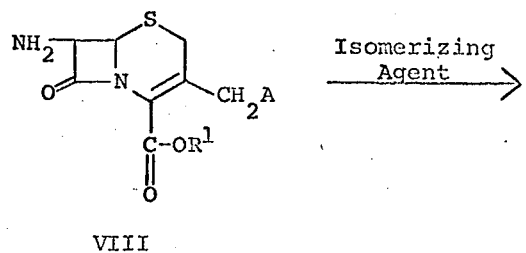

VIII

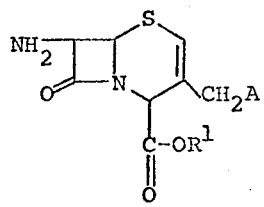

VII wherein A and R[1] are as defined above.

The preparation of the 7-acylamido-7-methoxy-2-cephem-4-carboxylic acid and its esters is described in detail in U.S. application Ser. No. 200,586 filed on Step C: Benzhydryl 3-carbamoyloxymethyl-7-bromo-7-azido-2-cephem-4-carboxylate To a solution of 0.900 g. of benzhydryl 3-carbamoyloxymethyl-7-diazo-2-cephem-4-carboxylate in 30 ml. of methylene chloride at 0°C. is added a solution of triethylammonium azide prepared as described below followed by the addition of a solution of bromine azide prepared as described below. The mixture is stirred at 0°C. for 5 more minutes or until $N_2$ evolution stops. Sodium bicarbonate (50 ml.; 5%) is added. The organic phase is separated and washed twice with 20 ml. of water, dried over anhydrous sodium sulfate, filtered and evaporated. Chromatography on silica gel affords the benzhydryl 3-carbamoyloxymethyl-7-bromo-7-azido-2-cephem-4-carboxylate.

The solution of bromine azide is prepared by mixing 2.4 g. of sodium azide in 4 ml. of water and 40 ml. of methylene chloride. The solution is cooled to −5°C. and 4 ml. of 50 percent V/V sulfuric acid is added dropwise over 5 minutes. The mixture is stirred at 0°–5°C. for another 5 minutes. The temperature is lowered to −10°C. solidifying the aqueous phase. The methylene chloride layer is poured off, dried over anhydrous sodium sulfate and divided into two equal 20 ml. portions. To one of the 20 ml. portions is added 1 g. of N-bromosuccinimide and the mixture is stirred at 0°–10°C. until the N-bromosuccinimide dissolves to afford the bromine azide solution.

The solution of triethylammonium azide is prepared by adding 0.8 ml. of triethylamine to the other 20 ml. portion of hydrogen azide solution.

Step D: Benzhydryl 3-carbamoyloxymethyl-7-methoxy-7-azido-2-cephem-4-carboxylate To a solution of 0.410 g. of benzhydryl 3-carbamoyloxymethyl-7-bromo-7-azido-2-cephem-4-carboxylate in 30 ml. of methanol is added 0.150 g. of silver fluoroborate. The mixture is stirred in the dark for 2½ hours and the solvent is removed under vacuum. The residue is taken up in 50 ml. of methylene chloride and washed twice with a saturated solution of sodium bicarbonate, twice with water, dried over anhydrous magnesium sulfate and evaporated to afford benzhydryl 3-carbamoyloxymethyl-7-methoxy-7-azido-2-cephem-4-carboxylate.

Step E: Benzhydryl 3-carbamoyloxymethyl-7-amino-7-methoxy-2-cephem-4-carboxylate Benzhydryl 3-carbamoyloxymethyl-7-azido-7-methoxy-2-cephem-4-carboxylate (0.25 g.) is dissolved in 25 ml. of dioxane. 0.250 Grams of platinium oxide is added and the reaction mixture is reduced again for 3 hours until the azide is completely reacted as determined by infrared analysis of aliquots. The solvent is removed under reduced pressure and the residue taken up in chloroform (15 ml.) and filtered through a small column of silica gel-G in chloroform. The column is eluted with chloroform until 60 ml. of chloroform are collected. The chloroform is removed under reduced pressure to afford benzhydryl 3-carbamoyloxymethyl-7-amino-7-methoxy-2-cephem-4-carboxylate.

Step F: Benzhydryl 3-carbamoyloxymethyl-7-(2-thienylacetamido)-7-methoxy-2-cephem-4-carboxylate Benzhydryl 3-carbamoyloxymethyl-7-amino-7-methoxy-2-cephem-4-carboxylate (0.25 g.) is dissolved in 20 ml. of methylene chloride and cooled to 0°C. 2-Thienylacetyl chloride (0.25 g.) is added and then 0.25 ml. of pyridine. The reaction mixture is allowed to stir at 0°C. for 20 minutes and then poured into 25 ml. of ice cold water. The organic phase is separated and washed once with a pH 2 phosphate buffer and then twice with a 5 percent aqueous sodium bicarbonate solution and then with water. The organic phase is dried and evaporated and the residue chromatographed on silica gel to afford benzhydryl 3-carbamoyloxymethyl-7-(2-thienylacetamido)-7-methoxy-2-cephem-4-carboxylate.

Step G: Benzhydryl 3-carbamoyloxymethyl-7-(2-thienylacetamido)-7-methoxy-3-cephem-4-carboxylate A solution of 0.2 g. of benzhydryl 3-carbamoyloxymethyl-7-(2-thienylacetamido)-7-methoxy-2-cephem-4-carboxylate in anhydrous pyridine (20 ml.) is maintained at room temperature for 3 days. The pyridine is then removed under reduced pressure and the isomeric mixture is chromatographed on silica gel to afford benzhydryl 3-carbamoyloxymethyl-7-(2-thienylacetamido)-7-methoxy-3-cephem-4-carboxylate.

Step H: 3-Carbamoyloxymethyl-7-(2-thienylacetamido)-7-methoxy-3-cephem-4-carboxylic Acid and Sodium Salt Benzhydryl 3-carbamoyloxymethyl-7-(2-thienylacetamido)-7-methoxy-3-cephem-4-carboxylate is dissolved in anisole (3.5 ml.) and treated with trifluoroacetic acid (10 ml.) at room temperature for 10 minutes. The anisole and trifluoroacetic acid are then removed under reduced pressure while maintaining the temperature below 40°C. The 3-carbamoyloxymethyl-7-(2-thienylacetamido)-7-methoxy-3-cephem-4-carboxylic acid is dissolved in chloroform and treated with water containing a stoichiometric amount of sodium hydroxide. The mixture is stirred for one-half hour at room temperature. The chloroform is removed and the aqueous phase washed with methylene chloride and lyophilized to afford sodium salt of 3-carbamoyloxymethyl-7-(2-thienylacetamido)-7-methoxy-3-cephem-4-carboxylic acid.

By following substantially the procedure described in Example 1, all of the products disclosed herein may be prepared. Thus, by substituting for the benzhydryl 3-carbamoyloxymethyl-7-(2-thienylacetamido)-7-methoxy-2-cephem-4-carboxylate of Example 1, Step F, another $\Delta^2$ cephalosporin and by treating with an appropriate isomerizing agent the corresponding $\Delta^3$ cephalosporin compound may be prepared.

The following equation, together with Table I, illustrates the starting materials and the intermediates and products which may be prepared.

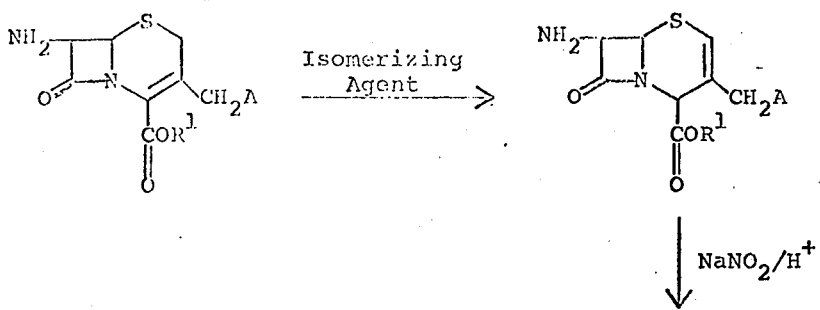

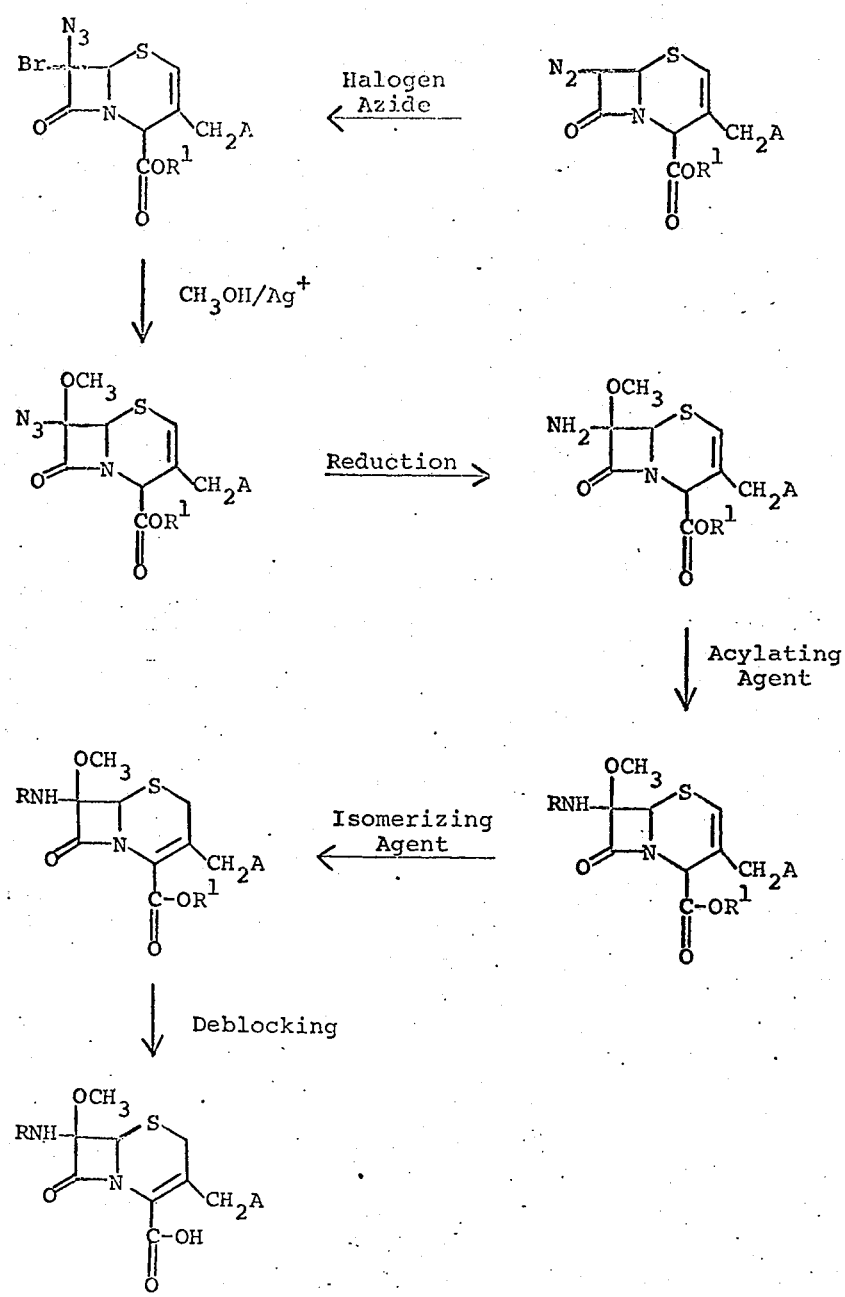

TABLE I
Continued

| Example No. | R | R¹ | A |
|---|---|---|---|
| 5 | HO–C₆H₄–CH(NH₂)–C(=O)– | –CH(φ)₂ | –OC(=O)NH₂ |
| 6 | thiazol-2-yl–CH₂–C(=O)– | –CH₂C(Cl)₃ | –OCH₃ |
| 7 | phenyl–CH(tetrazol-5-yl)–C(=O)– | –CH₂–C₆H₄–OCH₃ | –O–C(=O)CH₃ |
| 8 | thien-3-yl–CH₂–C(=O)– | –CH(φ)₂ | –OC(=O)CH₃ |
| 9 | phenyl–CH(COOH)–C(=O)– | –CH(φ)₂ | –OC(=O)NH₂ |
| 10 | thien-2-yl–CH(COOH)–C(=O)– | –C(CH₃)₃ | –OC(=O)NH₂ |
| 11 | phenyl–CH₂–C(=O)– | –CH₂C(=O)–φ | –OC(=O)NH₂ |
| 12 | (4-Br-C₆H₄)–CH₂–C(=O)– | –C(CH₃)₃ | H |
| 13 | NH₂CH₂–C₆H₄–CH₂–C(=O)– | –CH(φ)₂ | H |
| 14 | HO–C(=O)–CH₂–C₆H₄–CH₂–C(=O)– | –CH(φ)₂ | –OC(=O)NHCH₃ |
| 15 | HOC(=O)–NH–CH₂–C₆H₄–CH₂–C(=O)– | –CH₂–C₆H₄–OCH₃ | –OC(=O)N(CH₃)₂ |
| 16 | (5-NO₂-furan-2-yl)–CH₂–C(=O)– | –CH₂C(Cl)₃ | –OC(=O)φ |

TABLE I
(continued)
| Example No. | R | R¹ | A |
|---|---|---|---|
| 17 | 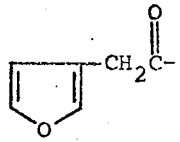 | $-CH_2\overset{O}{\underset{\|}{C}}-\phi$ | OH |
| 18 | 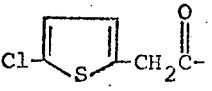 | $-C(CH_3)_3$ | Cl |
| 19 | 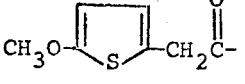 | $-CH(\phi)_2$ | Br |
| 20 | 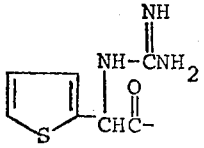 | $-CH(\phi)_2$ | H |
| 21 | 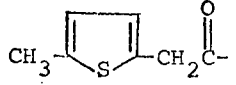 | $-CH_2\text{-}\phi\text{-}OCH_3$ | 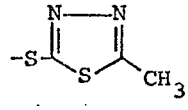 |
| 22 | 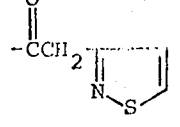 | $-CH_2C(Cl)_3$ | $-O\overset{O}{\underset{\|}{C}}CH_3$ |
| 23 | 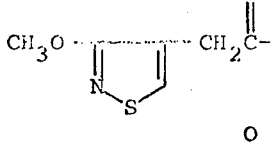 | $-CH_2C(Cl)_3$ | $-OCH_3$ |
| 24 | 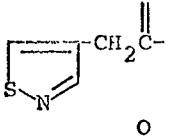 | $-C(CH_3)_3$ | $-O\overset{O}{\underset{\|}{C}}NHCH_3$ |
| 25 | 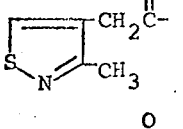 | $-CH(\phi)_2$ | 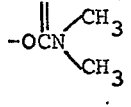 |
| 26 | 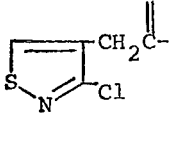 | $-CH_2\text{-}\phi\text{-}OCH_3$ | $-O\overset{O}{\underset{\|}{C}}CH_3$ |
| 27 | 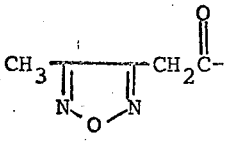 | $-CH_2\overset{O}{\underset{\|}{C}}\phi$ | 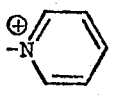 |

TABLE I
(continued)

| Example No. | R | R¹ | A |
|---|---|---|---|
| 28 | [isothiadiazole-CH₂C(O)-] | -CH₂C(O)-φ | Cl |
| 29 | [5-methyl-1,2,5-thiadiazol-3-yl-CH₂C(O)-] CH₃ group on ring | -CH₂C(Cl)₃ | pyridinium (⊕N) |
| 30 | [5-chloro-1,2,5-thiadiazol-3-yl-CH₂C(O)-] | -CH(φ)₂ | -S-[5-methyl-1,3,4-thiadiazol-2-yl] |
| 31 | [5-methoxy-1,2,5-thiadiazol-3-yl-CH₂C(O)-] -CH₃O- | -CH(φ)₂ | -OC(O)NH₂ |
| 32 | φ-SCH₂C(O)- | -C(CH₃)₃ | -OC(O)NH₂ |
| 33 | (4-pyridyl)-SCH₂C(O)- | -C(CH₃)₃ | -OC(O)NH₂ |
| 34 | CNCH₂C(O)- | -CH(φ)₂ | -OC(O)CH₃ |
| 35 | [1H-tetrazol-1-yl-CH₂C(O)-] | -CH(φ)₂ | H |
| 36 | φ-CH(F)C(O)- | -CH(φ)₂ | pyridinium (⊕N) |
| 37 | [2-thienyl-CH(NH₂)C(O)-] | -CH₂C(O)-φ | pyridinium (⊕N) |
| 38 | [2-thienyl-CH(NH₂)C(O)-] | -CH₂-φ-OCH₃ | pyridinium (⊕N) |
| 39 | [2-thienyl-C(O)CH₂C(O)-] | -C(CH₃)₃ | -OC(O)NH₂ |

TABLE I
(continued)

| Example No. | R | R¹ | A |
|---|---|---|---|
| 40 | phenyl-CH(PO(OH)₂)-C(O)- | $-CH_2C(Cl)_3$ | H |
| 41 | phenyl-CH(NHSO₃H)-C(O)- | $-CH(\phi)_2$ | $OCH_3$ |
| 42 | phenyl-CH(OH)-C(O)- | $-CH(\phi)_2$ | $-OH$ |
| 43 | phenyl-CH(SO₂(OH))-C(O)- | $-CH(\phi)_2$ | $-OH$ |
| 44 | 2-thienyl-CH₂-C(O)- | $-CH_2OCH_3$ | $-OC(O)NH_2$ |

What is claimed is:

1. The process for preparing a compound of the formula:

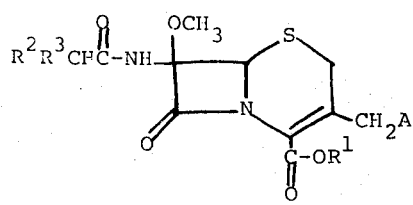

wherein

A is hydrogen, hydroxy, azido, halo, carbamoyloxy, N-lower alkyl carbamoyloxy; N,N-di-lower alkyl carbamoyloxy, pyridyl, lower alkoxy, lower alkanoyloxy benzoyloxy or 5-membered heterocyclic thio;

R¹ is hydrogen, trichloroethyl, tert-butyl, benzoylmethyl, p-methoxybenzyl, benzyl, benzhydryl, trimethylsilyl or methoxymethyl;

R² is hydrogen, halo, amino, guanidino, phosphono, hydroxy, tetrazolyl, carboxy or sulfamino; and R³ is phenyl, phenyl substituted on the phenyl carbon atoms by halogen, hydroxy, aminomethyl, carboxymethyl, carboxamidomethyl; a 5- or 6-membered monocyclic heterocycle containing one or more oxygen, sulfur or nitrogen atoms in the ring, substituted heterocycles wherein the substituent is halo, carboxymethyl, guanidino, guanidinomethyl, carboxamidomethyl, aminomethyl, nitro, methoxy or methyl; phenylthio, pyridylthio and substituted pyridylthio wherein the substituents are halo, carboxymethyl, guanidino, guanidinomethyl, carboxamidomethyl, aminomethyl, nitro, methoxy, methyl or cyano, which comprises dissolving a compound of the formula:

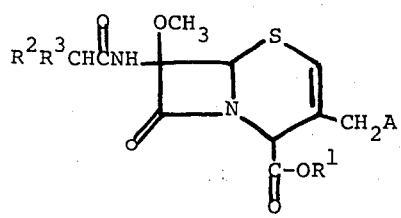

wherein A, R¹, R² and R³ are as defined above in an inert solvent and treating said solution for 5 hours to 3 days or until isomerization is complete with an isomerizing agent selected from the group of inorganic bases consisting of alkali metal carbonates and hydroxides, alkaline earth metal carbonates and hydroxides, alumina and silica gel, wherein said inert solvent is water with a water miscible organic solvent.

2. The process according to claim 1 wherein

A is hydrogen, lower alkanoyloxy, carbamoyloxy or pyridine;

R¹ is hydrogen or trichloroethyl, tert-butyl, benzoylmethyl, p-methoxybenzyl, benzyl, benzhydryl, trimethylsilyl or methoxymethyl;

R² is hydrogen, amino or carboxy; and

R³ is phenyl or a 5- or 6-membered heterocyclic ring containing from 1 to 2 sulfur, oxygen or nitrogen atoms.

3. The process according to claim 1 wherein
A is hydrogen, acetoxy, carbamoyloxy or pyridyl;
R¹ is hydrogen, trichloroethyl, tert-butyl, benzoylmethyl, p-methoxybenzyl, benzyl, benzhydryl, trimethylsilyl or methoxymethyl;
R²R³

is 2-furylacetyl, 2-thienylacetyl, 3-thienylacetyl, 5-thiazolylacetyl, D-phenylglycyl, phenylmalonyl, 2-thienylmalonyl or α-tetrazolylphenylacetyl.

4. The process according to claim 1 wherein the inorganic bases are selected from the group consisting of sodium carbonate, potassium carbonate, sodium hydroxide, calcium hydroxide, alumina and silica gel.

5. The process according to claim 4 for preparing methoxy methyl ester of 3-carbamoyloxymethyl-7-(2-thienylacetamido)-7-methoxy-3-cephem-4-carboxylic acid from the methoxymethyl ester of 3-carbamoyloxymethyl-7-(2-thienylacetamido)-7-methoxy-2-cephem-4-carboxylic acid.

6. The process according to claim 4 for preparing the dibenzhydryl ester of 3-carbamoyloxymethyl-7-phenylmalonamido-7-methoxy-3-cephem-4-carboxylic acid from the dibenzhydryl ester of 3-carbamoyloxymethyl-7-phenylmalonamido-7-methoxy-2-cephem-4-carboxylic acid.

7. The process according to claim 4 for preparing the benzhydryl ester of 3-carbamoyloxymethyl-7-(2-furylacetamido)-7-methoxy-3-cephem-4-carboxylic acid from the benzhydryl ester of 3-carbamoyloxymethyl-7-(2-furylacetamido)-7-methoxy-2-cephem-4-carboxylic acid.

8. A process for preparing a compound of the formula:

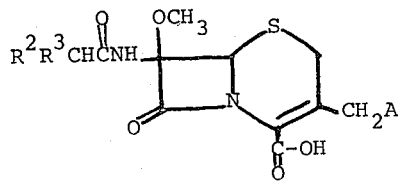

or a non-toxic, pharmaceutically acceptable salt thereof wherein
A is hydrogen, hydroxy, azido, halo, carbamoyloxy, N-lower alkyl carbamoyloxy; N,N-di-lower alkyl carbamoyloxy, pyridine, lower alkoxy, lower alkanoyloxy benzoyloxy or 5-membered heterocyclic thio;
R² is hydrogen, halo, amino, guanidino, phosphono, hydroxy, tetrazolyl, carboxy or sulfamino; and
R³ is phenyl, phenyl substituted on the phenyl carbon atoms by halogen, hydroxy, aminomethyl, carboxymethyl, carboxamidomethyl, a 5- or 6-membered monocyclic heterocycle containing one or more oxygen, sulfur or nitrogen atoms in the ring, substituted heterocycles wherein the substituent is halo, carboxymethyl, guanidino, guanidinomethyl, carboxamidomethyl, aminomethyl, nitro, methoxy or methyl; phenylthio, pyridylthio and substituted pyridylthio wherein the substituents are halo, carboxymethyl, guanidino, guanidinomethyl, carboxamidomethyl, aminomethyl, nitro, methoxy, methyl or cyano which comprises dissolving a compound of the formula:

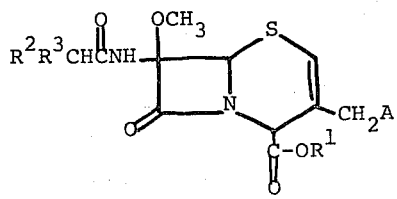

wherein A, R² and R³ are as defined above and R¹ is an ester group selected from the group of esters consisting of trichloroethyl, tert-butyl, benzoylmethyl, p-methoxybenzyl, benzyl, benzhydryl, trimethylsilyl or methoxymethyl in an inert solvent and treating said solution for 5 hours to 3 days or until isomerization is complete with an isomerizing agent selected from the group of inorganic bases consisting of alkali metal carbonates and hydroxides, alkaline earth metal carbonates and hydroxides, alumina and silica gel, wherein said inert solvent is water with a water miscible organic solvent and removing said ester group.

9. The process according to claim 8 for preparing 7-methoxy-7-(2-thienylacetylamido)-3-carbamoyloxymethyl-3-cephem-4-carboxylic acid or a sodium salt thereof.

10. The process according to claim 8 for preparing 7-methoxy-7-(α-amino-α-phenylacetamido)-3-carbamoyloxymethyl-3-cephem-4-carboxylic acid or a sodium salt thereof.

11. The process according to claim 8 for preparing 7-methoxy-7-(α-carboxyphenylacetamido)-3-carbamoyloxymethyl-3-cephem-4-carboxylic acid or a sodium salt thereof.

12. The process according to claim 8 for preparing 7-methoxy-7-(phenylmalonamido)-3-carbamoyloxymethyl-3-cephem-4-carboxylic acid or a sodium salt thereof.

13. The process according to claim 8 for preparing 7-methoxy-7-(2-furylacetamido)-3-carbamoyloxymethyl-3-cephem-4-carboxylic acid or a sodium salt thereof.

* * * * *

UNITED STATES PATENT OFFICE
CERTIFICATE OF CORRECTION

PATENT NO. : 3,887,549
DATED : June 3, 1975
INVENTOR(S) : BURTON G. CHRISTENSEN

It is certified that error appears in the above—identified patent and that said Letters Patent are hereby corrected as shown below:

Column 19, line 6, delete the line "$R^2R^3$".

Signed and Sealed this second Day of September 1975

[SEAL]

Attest:

RUTH C. MASON
Attesting Officer

C. MARSHALL DANN
Commissioner of Patents and Trademarks